United States Patent [19]
Kreuzer

[11] Patent Number: 5,108,064
[45] Date of Patent: Apr. 28, 1992

[54] APPLIANCE SUPPORT

[75] Inventor: Friedhelm Kreuzer, München, Fed. Rep. of Germany

[73] Assignee: F.M.K. Kreuzer GmbH & Co. KG., Fed. Rep. of Germany

[21] Appl. No.: 609,889

[22] Filed: Nov. 6, 1990

[30] Foreign Application Priority Data

Nov. 10, 1989 [DE] Fed. Rep. of Germany ....... 3937518

[51] Int. Cl.$^5$ ............................................. A47H 1/10
[52] U.S. Cl. .................................. 248/327; 248/297.2
[58] Field of Search ................... 248/296, 297.2, 297.3, 248/327, 324, 326, 325, 245, 333, 639; 211/207, 190, 193; 128/906

[56] References Cited

U.S. PATENT DOCUMENTS

| | | | |
|---|---|---|---|
| 1,711,158 | 4/1929 | Rece | 248/297.2 X |
| 3,164,355 | 1/1965 | Seitz | 248/324 |
| 3,627,250 | 12/1971 | Pegrum | 248/324 |
| 4,523,683 | 6/1985 | Fullkamp | 211/190 |
| 4,725,030 | 2/1988 | Miller | 248/297.2 |
| 4,901,967 | 2/1990 | Petre | 248/327 |
| 4,993,683 | 2/1991 | Kreuzer | 248/639 |

Primary Examiner—J. Franklin Foss
Attorney, Agent, or Firm—Donald Brown

[57] ABSTRACT

An appliance support as used in particular in intensive care stations of hospitals comprises a support arm for receiving support members for the appliances and supply connections for operating the same. Such an appliance support shall be modified to allow as many appliances, such as pumps and the like, as possible to be mounted thereto and to be movable relative thereto. To this end the support arm comprises a longitudinally extending groove and a support member being slidable in the groove and being pivotable around an axis relative to the support arm.

9 Claims, 5 Drawing Sheets

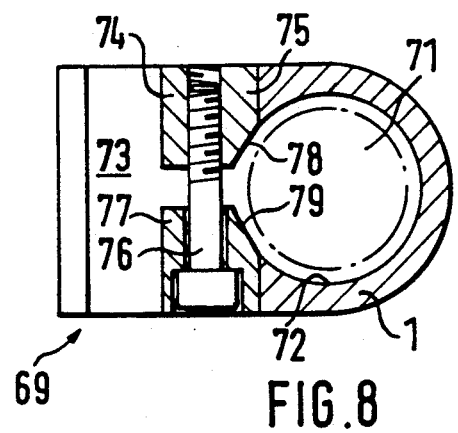
FIG.8
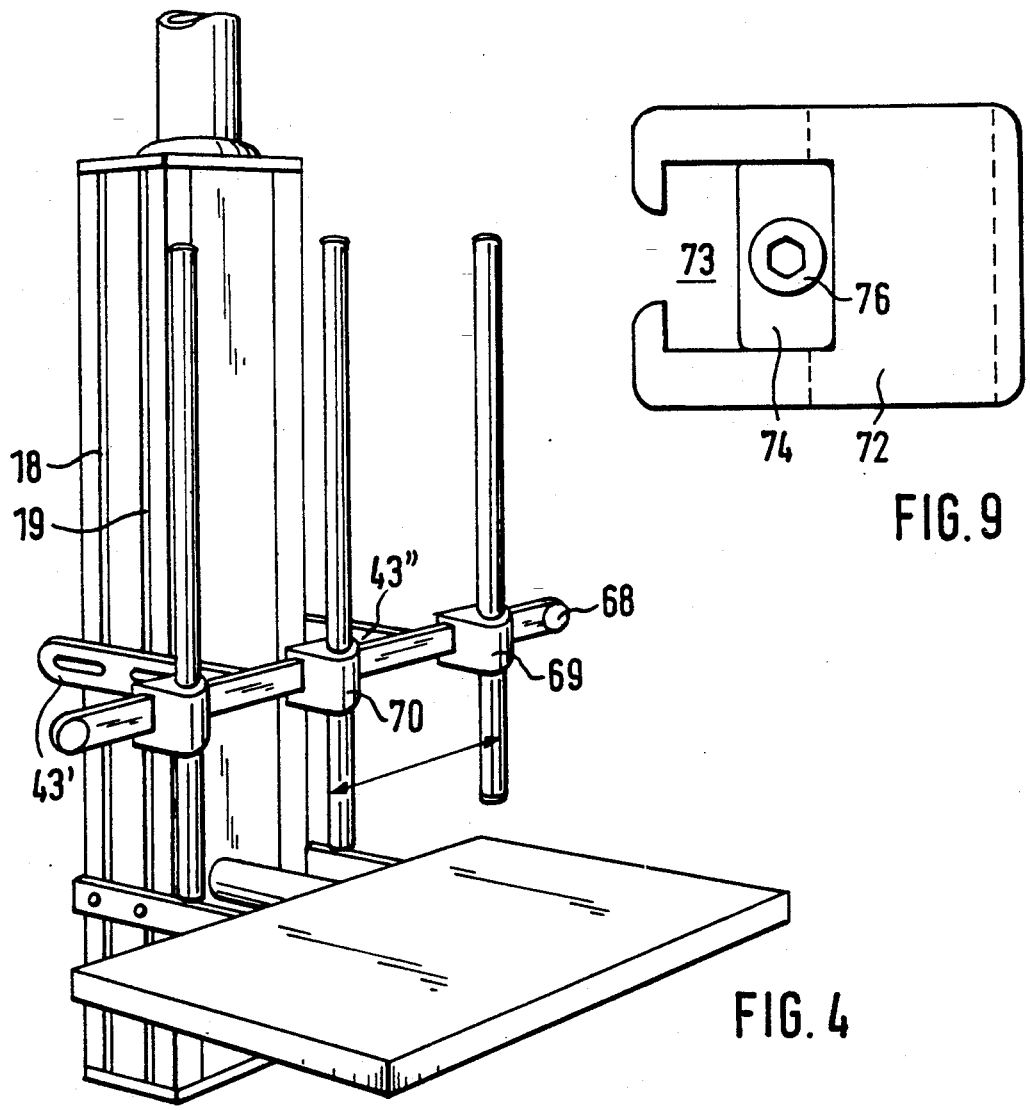
FIG.9
FIG.4

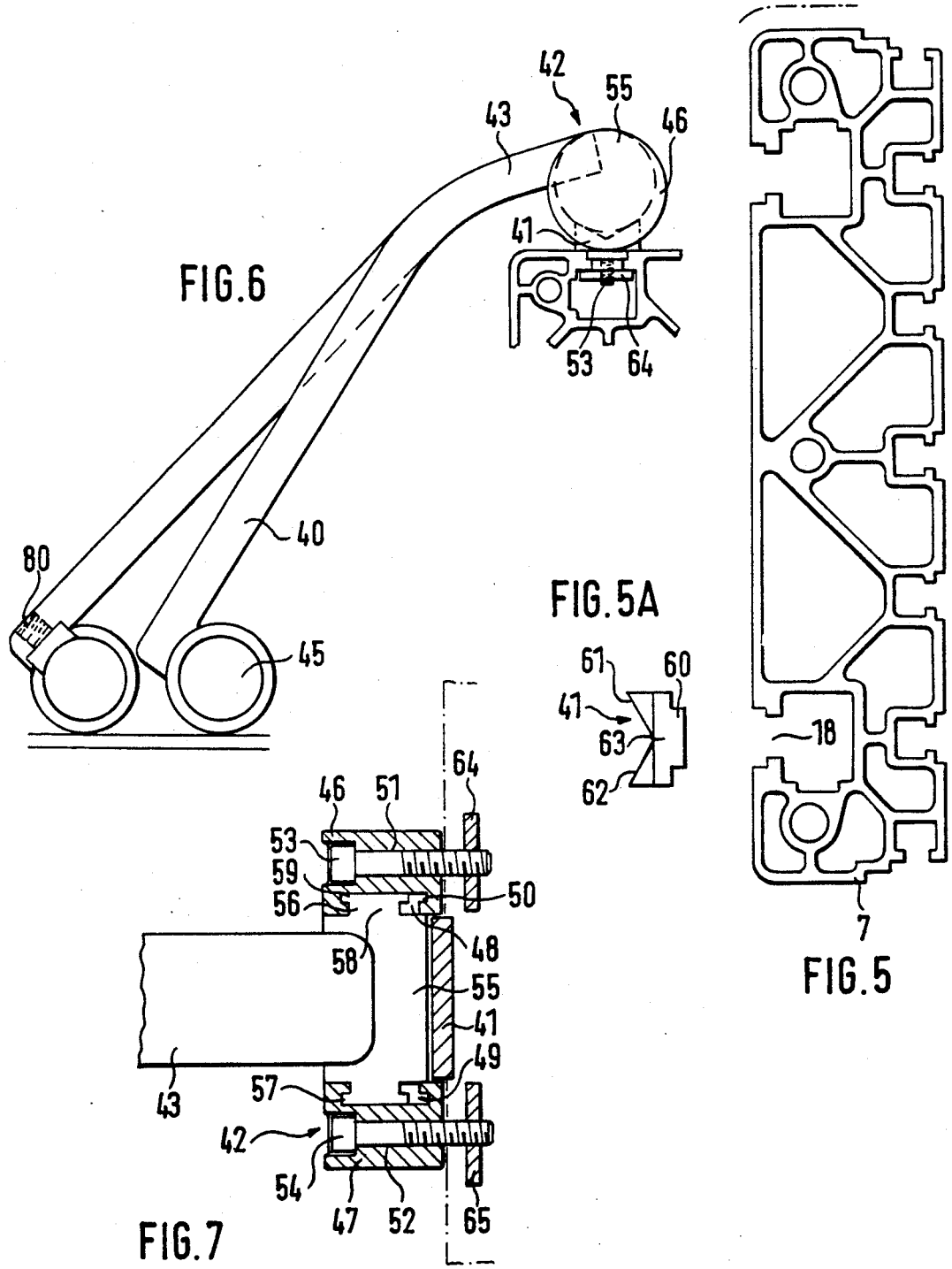

5,108,064

APPLIANCE SUPPORT

BACKGROUND OF THE INVENTION

The invention relates to an appliance support having an arm receiving support members for appliances and supply connections for operating the appliances or the like. Such appliance supports are in particular used for carrying medical appliances, predominantly in form of so-called overhead or wall supports.

An appliance support of this kind is, for example, disclosed in DE 36 27 517 A1. Cross beams have appliance supports formed as support arms mounted thereto and support members for carrying the appliances are provided at a predetermined level of the support arms. The appliance supports in form of the support arms are tubular. The supply connections are passed through the interior of these tubes and emerge therefrom at a predetermined point for connection to the carried appliances. The support members are rigidly mounted to the support arms.

OBJECTS OF THE INVENTION

It is an object of the invention to provide an improved appliance support. It is a further object to provide an appliance support of the above described kind and in particular in the form of support arms such that it provides an easy way of mounting or removing support members for carrying pumps or the like to the support and adjusting the relative elevation thereof.

SUMMARY OF THE INVENTION

According to the invention an appliance support comprises a support column providing support for appliances or the like and connections for operating the same, said support column comprising two profiled members and two wall members extending transversely to said profiled members and interconnecting the same such that said profiled members and said wall members define a supply channel, said profiled members having at least one longitudinally extending groove and a support member is provided and adapted to slide in the groove and to pivot around an axis relative to said support column.

BRIEF DESCRIPTION OF THE DRAWINGS

Further advantages, features and objects of the invention will stand out from the following description of exemplary embodiments with reference to the drawings. In the drawings

FIG. 4 is a perspective representation of a second embodiment;

FIG. 5 shows a section through a profile used in the embodiments;

FIGS. 5a is a top view of member 41

FIG. 6 is a sectional view along line VI—VI in FIG. 3;

FIG. 7 represents a section through the pivot axis of a hinge;

FIG. 8 is a section along line VIII—VIII in FIG. 3;

FIG. 9 is a side view of the part shown in FIG. 8 in a direction perpendicular to the section shown in FIG. 8.

DESCRIPTION OF PREFERRED EMBODIMENTS

Figure 1:
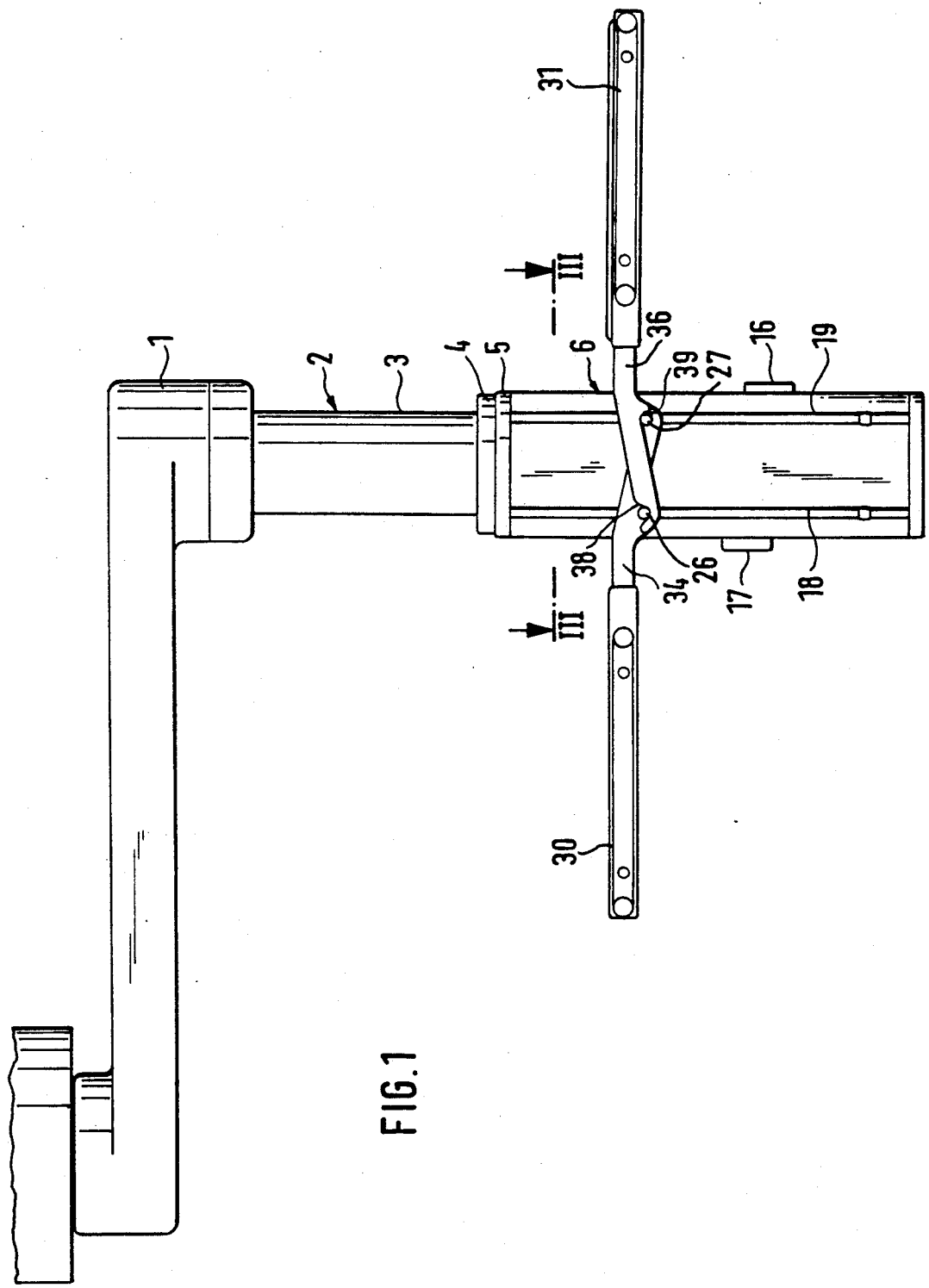
FIG. 1 is a schematic representation of a support with an appliance support.

The support shown in FIG. 1 comprises a support arm 1 and a support column 2 carried by the support arm 1. The support column 2 comprises a columnar portion 3 connected to the support arm and a profiled portion 6 connected to the columnar portion 3 through flanges 4, 5.

Figure 2:
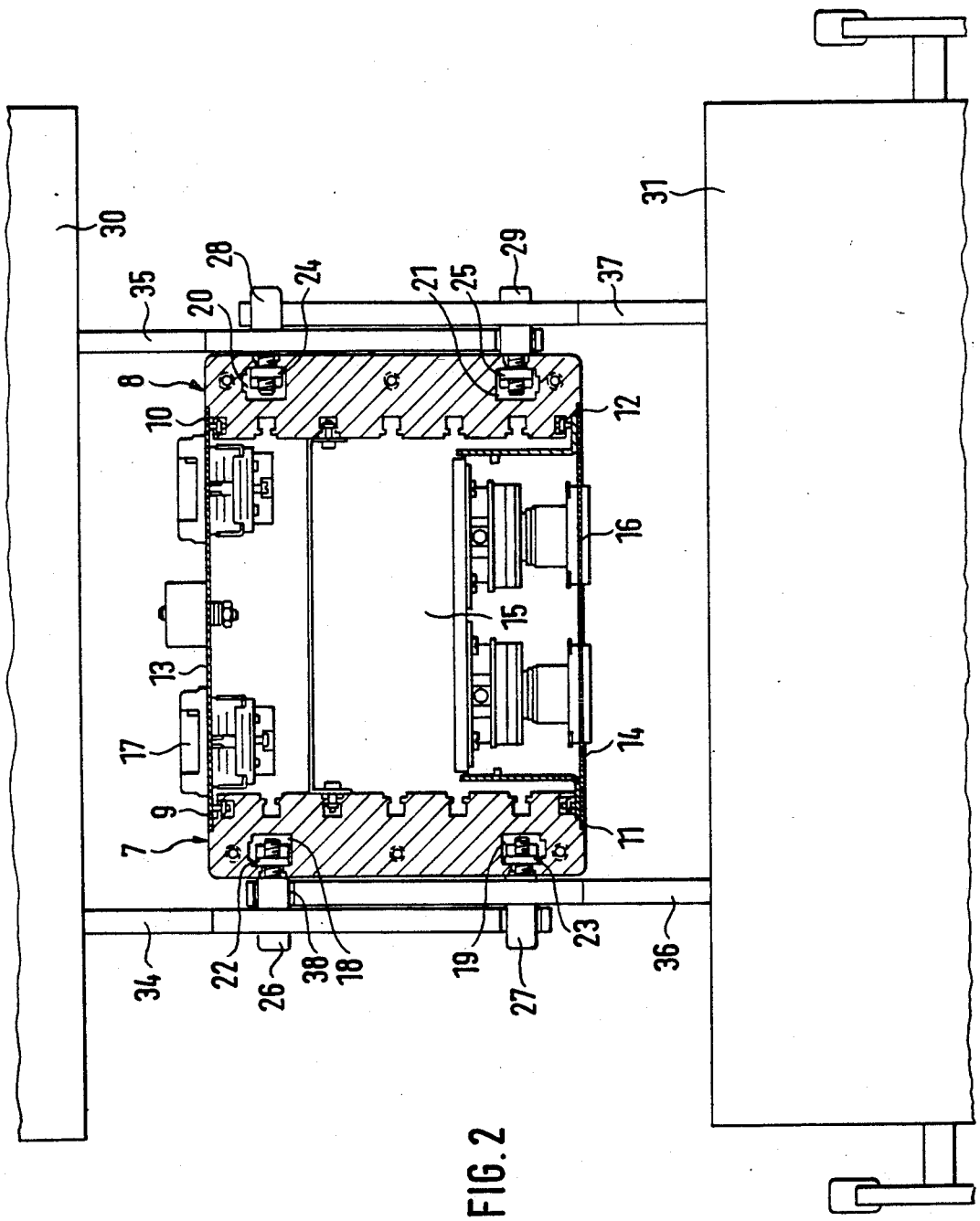
FIG. 2 is a sectional view along line III—III in an enlarged scale.

As best shown in FIG. 2, the profiled portion 6 comprises two mutually parallel profiled wall portions 7, 8. Recesses 9 to 12 are provided at the respective ends of the facing front sides of the profiled wall portions. Walls 13, 14 extending transversely to the profiled wall portions are inserted into the recesses 9 to 12 and screwed to the profiled wall portions such that the profiled wall portions and the walls together define a channel 15. Supply lines are passed through the channel 15 to connection terminals 16, 17 mounted at the walls 13, 14.

Two spaced T-grooves 18 to 21 are provided at the outer front face of each of the wall portions 7, 8 running each close and parallel to the respective edge of the wall portion. All four grooves are parallel to each other and parallel to the axis of the channel 15 and hence, to the axis of the support column 2 itself.

At least one nut 22 to 25 is slidably provided in each of the grooves. The nut cooperates with a bolt 26 to 29 having a bolt-shaped portion to form a support member. By loosening the bolt the elevation of the support member can be adjusted along the groove. In this manner the elevation of the support members along the total length of the grooves 18, 19 can be adjusted such that support platforms 30, 31 can be mounted thereto. Each support platform has fork-like pair of arms 34 to 37 at the mounting side thereof. Each arm has a groove 38 formed at the upper side at the free end thereof. The size of the groove 38 is selected such that it fits the bolt 27 for engagement therewith. A recess 39 receiving the respective bolt 26 is provided at the bottom side of the arm or support platform in a distance from the groove 38 which corresponds to the distance between the two grooves 18, 19. As best shown in FIG. 1, the free end of the arms is inclined relative to the platform such that in a horizontal position of the platform the upper groove 38 and the lower recess 39 lie in a plane parallel to the platform.

In operation four support members are adjusted in the respective elevation for each desired level of the support platform. Thereupon the support platform is mounted by fitting the free ends of the fork arms below the remote support members and lowering the platform ends thereof onto the second pair of support members. As shown in the figures, the size of the support members is selected such that a pair of two opposite support platforms may be mounted thereto.

As shown in FIG. 2, the recesses 9 to 12 are as well formed as T-shaped grooves extending parallel to the channel axis, whereby the mounting of the walls 13, 14 is facilitated by displaceable bolts in the grooves.

As further shown in FIG. 2, the two wall portions 7 and 8 have further T-shaped grooves provided at their facing inner sides thereof, such that elevation-adjustable fittings or the like may be mounted within the interior of the channel.

Figure 3:
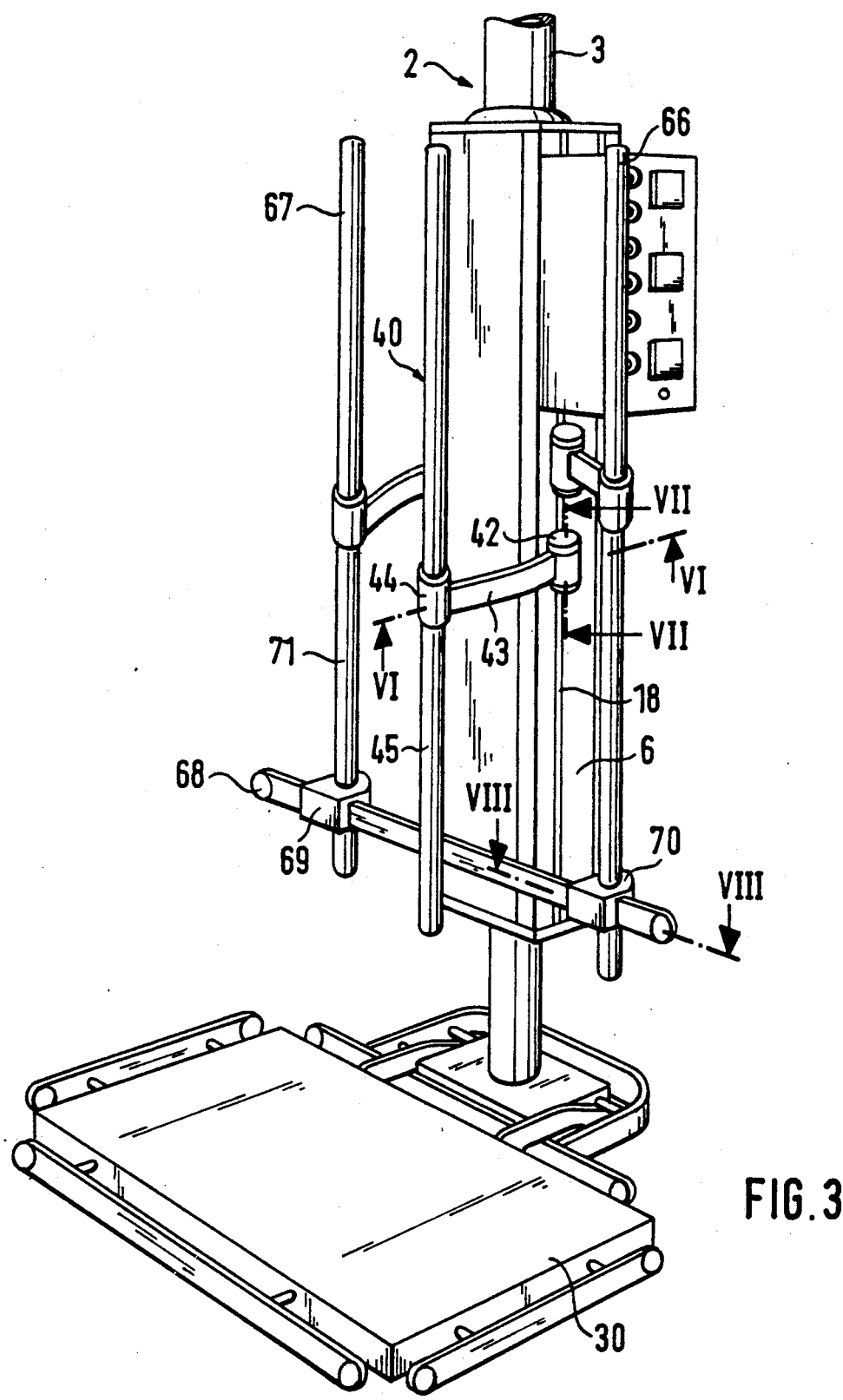
FIG. 3 is a perspective representation of a first embodiment.

As best shown in FIG. 3, a first support member 40 is mounted to the profiled portion 6 of the support column 2. The support member 40 comprises a hinge 42 adapted to be fixed to the support column 2, an arm-shaped second part 43 connected with the hinge 42, a mounting 44 provided at the free end of a second part 43 and a bar 45 carried by the mounting 44. The bar 45 serves to carry pumps or similar appliances which are required in particular for the medical care of patients.

The hinge 42 is represented in detail in the FIGS. 5 to 7. It comprises an upper mounting part 46 and a lower mounting part 47. Each mounting part has a respective recess 48, 49 with groove-shaped undercut 50 at the facing sides thereof. A respective bore 51, 52 receiving a bolt 53, 54 is provided in a direction perpendicular to the respective axes of the recesses 48, 49.

A journal or trunnion 55 extending perpendicularly to the arm-shaped part 43 is provided at the hinge end of the arm-shaped second part 43. The trunnion comprises projections 56, 57 provided at the upper and lower ends thereof. The projections 56, 57 consist of a neck 58 and a portion 59 thereabove having an enlarged diameter. The size of the neck 58 and the enlarged portion 59 are selected such that the enlarged portion can be inserted into the respective recess 48, 49 and engages the groove-shaped undercut 50 while being guided thereby.

A member 41 is provided between the upper and lower mounting parts 46, 47 on the rear side facing the groove 18. The member 41 has a rear portion 60 which is formed to fit into the groove 18 and is inserted thereinto. Two mutually inclined abutment surfaces 61, 62 extending in direction of the groove are provided at the side of the member 41 facing the hinge. The abutment surfaces 61, 62 form a groove-like base 63 extending parallel to the direction of the groove in the center of the member 41.

The hinge is mounted in such a manner that the upper and lower mounting part 46, 47 are placed on the trunnion 55, the combined hinge with the member 41 at the rear side thereof is inserted into the groove 18 and the complete hinge is thereafter fixed to the profiled portion 6 by means of the bolts 53, 54 and the cooperating nuts 64, 65 provided within the groove.

As best shown in FIG. 7, the diameter of the recesses 48, 49 is considerably larger than the diameter of neck 58 and enlarged portion 59. By tightening the bolts 53, 54 the trunnion 55 is pressed against the two surfaces 61, 62 such that the hinge is fixed and a horizontal swing or sweep is prevented.

As shown in FIG. 3, a further pair of support members or holding devices 66, 67 formed in the same manner can be provided in addition to the aforementioned support member or in place thereof. The two support members of this pair are interconnected through a cross member 68 and associated joints 69, 70. The construction of the joints 69, 70 is shown in detail in FIGS. 8 and 9. The joint comprises a cylindrical portion 72 embracing the bar 71 received therein. The cylindrical portion is followed on one side by a second portion having a recess 73 extending in a direction perpendicular to the axis of the cylindrical portion. The wall between the recess 73 and the interior of the cylindrical portion 72 has a recess with a locking member 74 best shown in FIG. 8 being inserted thereinto. The locking member has a first block or body 75 with an internal screw thread cooperating with a bolt 76. The second block or body 77 has a bore receiving the bolt 76. The two blocks have two symmetrically arranged prismatic portions with abutment surfaces 78, 79 which are mutually inclined, as best shown in FIG. 8. The inclination of the surfaces 78, 79 is selected such that they substantially coincide with the tangential direction of the inner surface of the cylindrical portion in case of a distance between both blocks. The recess 73 is formed such that there is just enough room to receive the cross member 68 after inserting the locking member 74. After the bolt 76 being loosened the cross member 68 can be reciprocated within the recess 73 and the joint 69 can be slidably displaced upwards and downwards along the bar 71. When the bolt 76 is tightened the two blocks are pressed towards each other with the consequence that a clamping pressure is exerted onto the bar 71 and on the other hand the blocks, when approaching each other, are moved in direction of the recess 73 such that by tightening a single screw a lock with the bar 71 and the cross member 68 is simultaneously obtained.

The respective mounting 44 for connecting the arm-shaped second part 43 with the associated bar comprises, as best shown in FIG. 6, a locking device 80 which is formed such that by loosening a screw the bar can be slidably displaced upwards or downwards relative to the mounting 44.

In the embodiment shown in FIG. 4 the arms 43', 43" are directly connected with the grooves by suitable screw connections. The cross member 68 is connected with the arms 43', 43". The bars are mounted to the cross member 68 through joints corresponding to the joints 69, 70 such that the bars are laterally displaceable on the cross member 68 and movable upwards and downwards.

The appliances to be mounted to the bars have respective straps or clamps for fixing the appliances at the bars.

Although the invention has been described with reference to specific example embodiments, it is to be understood that it is intended to cover all modifications and equivalents within the scope of the appended claims.

What is claimed is:

1. A medical support column for providing support for appliances and connections for operating said supported applicances or the like, comprising two profiled members, each being formed integrally and each having at least one longitudinally extending groove therein, two wall members extending transversely to said profiled members for interconnecting said profiled members such that said profiled members and said wall members define an inner supply channel, and at least one support member being provided adapted to slide in said groove.

2. The appliance support of claim 1, wherein said support column has a respective longitudinal groove provided on two opposite sides of the support column, and a corresponding support member is provided on each side.

3. The appliance support of claim 1, wherein said groove has a T-shaped cross-section.

4. The appliance support of claim 1, wherein said support member comprises a first member mounted in said groove and a second member which is hinged to the first member and comprises a support bar for mounting pumps and the like thereto.

5. The appliance support of claim 2, comprising a cross member for connection of the two support members.

6. The appliance support of claim 4, wherein said support bars extend substantially parallel to the longitudinal direction of said support column.

7. The appliance support of claim 4, comprising a lock for locking the hinge between said first and second members.

8. The appliance support of claim 1, comprising arms mounting said support members by means of screw connections in said grooves, said arms comprising elongate holes for allowing a vertical or depth adjustment of said support members.

9. The appliance support of claim 1, comprising holding members inserted into said grooves for mounting table-type appliance carriers.

* * * * *